United States Patent [19]

New

[11] Patent Number: 4,621,341
[45] Date of Patent: Nov. 4, 1986

[54] METHOD AND APPARATUS FOR TRANSFERRING DATA IN PARALLEL FROM A SMALLER TO A LARGER REGISTER

[75] Inventor: Bernard J. New, Los Gatos, Calif.

[73] Assignee: Advanced Micro Devices, Inc., Sunnyvale, Calif.

[21] Appl. No.: 644,403

[22] Filed: Aug. 24, 1984

[51] Int. Cl.$^4$ .............................................. G06F 3/00
[52] U.S. Cl. .................................................... 364/900
[58] Field of Search ... 364/200 MS File, 900 MS File; 377/106, 115, 130

[56] References Cited

U.S. PATENT DOCUMENTS 4,447,878  5/1984  Kinnie et al. ...................... 364/200
4,514,808  4/1985  Murayama et al. ................. 364/200

*Primary Examiner*—James D. Thomas
*Assistant Examiner*—Michael Ure
*Attorney, Agent, or Firm*—Patrick T. King; Warren M. Becker; J. Vincent Tortolano

[57] ABSTRACT

A method and apparatus for transferring data in parallel from a smaller to a larger register is described, in which the larger register comprises a first and a second set of master and slave latches with a one shot employed for clocking the master latches in the first set. In operation, a first word from the smaller register is latched into the first set of master latches in response to an output from the one shot which occurs on the trailing edge of a clock pulse applied to the larger register. On the leading edge of a subsequent clock pulse applied to the larger register, a second data word is latched in the second set of master latches. Immediately thereafter the first and the second set of slave latches are opened for transferring the first and second words at their inputs to their outputs in parallel. Following the transfer of the first and second words to the outputs of the first and second set of slave latches, the slave latches close, latching the first and second words. Immediately thereafter the first and second master latches open to begin the next cycle of data transfer.

15 Claims, 3 Drawing Figures

METHOD AND APPARATUS FOR TRANSFERRING DATA IN PARALLEL FROM A SMALLER TO A LARGER REGISTER

BACKGROUND OF THE INVENTION

1. Field of the Invention

The present invention relates to a method and apparatus for transferring data from one register to another in general and to a method and apparatus for transferring data in parallel from a smaller to a larger register in particular.

2. Discussion of Prior Art

Usually data is transferred in parallel between registers of equal size using a common clock. However, on occasion, it is desirable and sometimes necessary to transfer data in parallel from a smaller register to a larger register.

In the past, when data has been transferred in parallel from a smaller to a larger register, it has been the practice to temporarily store a first word comprising a first predetermined number of bits from the smaller register in latches. Thereafter, the first word from the latches and a second word comprising a second number of predetermined bits from the smaller register were transferred in parallel to the larger register. Usually, though not necessarily, the smaller register was half the size of the larger register and consequently the data transfer to the larger register simply comprised two successive transfers of a word comprising bits equal in number to the size of the smaller register.

To avoid a loss of speed which would otherwise result as a consequence of transferring two or more data words out of one register and into a larger register in parallel, it has been the practice to clock the data out of the smaller register at a multiple of the clock rate used for clocking data into the larger register. For example, if the larger register was twice the size of the smaller register, the clock rate used for transferring data out of the smaller register and into the larger register was typically twice the rate used for clocking data in parallel into the larger register.

Heretofore, the registers between which data transfers were made and the latching circuits used for transferring data from a smaller to a larger register were typically fabricated on separate integrated circuit components. Thus, when it became necessary or desirable to transfer data in parallel from a smaller to a larger register, it was necessary to assemble and connect the separate integrated circuit components containing the registers and the latches together to form the required apparatus. As a consequence, the use of latches to temporarily store bits in the process of transferring data in parallel from a smaller to a larger register was expensive both in terms of the cost of the latches as well as in terms of the space required to accommodate the latches and the circuitry required to connect them between the smaller and larger registers.

SUMMARY OF THE INVENTION

In view of the foregoing, principal objects of the present invention are a method and apparatus for transferring data in parallel from a smaller to a larger register which do not require or embody the separate temporary storage latches required in related prior known apparatus.

In accordance with the above objects and in a preferred embodiment of the present invention, the larger of the two registers to which data is to be transferred in parallel comprises a plurality of register stages which are fabricated using emitter-coupled logic (ECL) or equivalent technology. In each stage there is provided a master latch and a slave latch. The master latch has an inverted latch enable input. The slave latch has a true latch enable input. The enable input of a first set of master latches comprising a predetermined number of the total number of master latches is coupled to the output of a monostable multivibrator, also called a one shot. The input of the one shot is coupled to a source of clock pulses. A switch is also coupled in parallel with the one shot for routing the clock pulses around the one shot when the registers to and from which the data is transferred are the same size. The enable input of each of the slave latches and a second set of master latches comprising the remainder of the total number of master latches is coupled to the source of clock pulses.

In the preferred embodiment of the present invention, to transfer data in parallel from a 16 bit register to a 32 bit register, the data is transferred from the smaller register to the larger register at a clock rate which is twice the rate of the clock used for clocking the larger register. As a consequence, two words are shifted out of the smaller register and transferred in parallel to the larger register in the period of one clock cycle of the larger register.

In order to accomplish the data transfer in the manner described, the first word is shifted out of the smaller register such that the signal levels of the first word are stable, i.e., the data is valid, on the input of the first set of master latches at a time which coincides with the trailing edge of a clock pulse applied to the larger register. At that time, and in response to said trailing edge, all of the slave latches are disabled or "closed" and, after a predetermined delay, the second set of master latches are enabled, i.e. opened, and the one shot outputs a narrow enabling pulse which enables and "opens" for a period equal to the width of the enabling pulse the first set of master latches. With the slave latches closed, as soon as the first set of master latches closes, the first work is "captured", i.e. latched, in the first set of master latches and becomes available on the input of the slave latches coupled thereto.

Thereafter, the second word is shifted out of the smaller register such that the signal levels of the second word are stable, i.e., the data is valid, on the input of the second set of master latches at a time which coincides with the leading edge of the next clock pulse applied to the larger register. At that time, and in response to said leading edge, the second set of master latches closes latching the second word therein. Immediately thereafter, and in response to said leading edge, all the slave latches open and the first and second words now on their inputs is transferred in parallel to their outputs.

BRIEF DESCRIPTION OF THE DRAWING

The above and other objects, features and advantages of the present invention will become apparent from the following detailed description of the accompanying drawing in which.

DETAILED DESCRIPTION OF THE DRAWING

Figure 1:
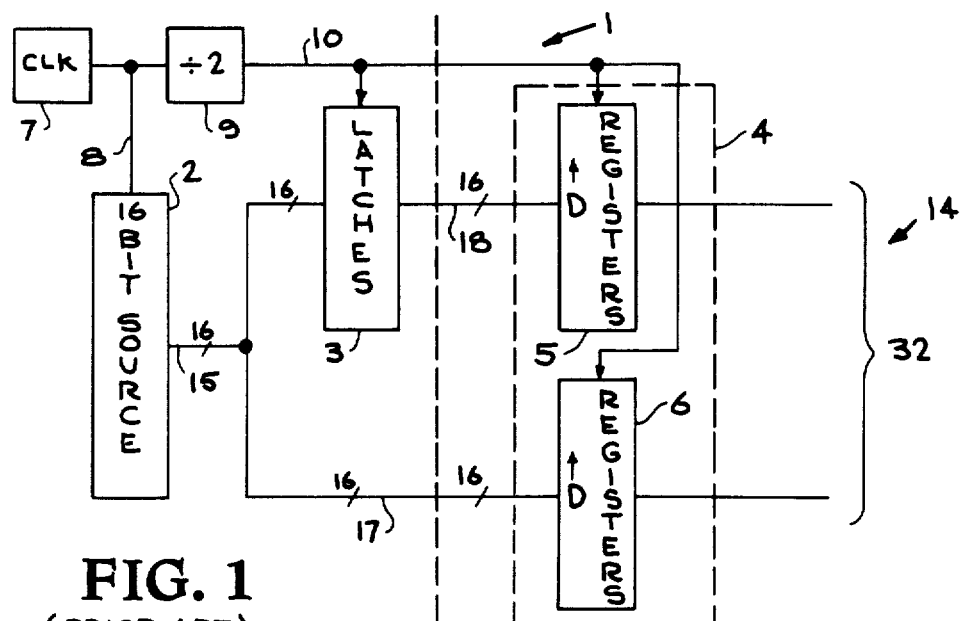
FIG. 1 is a block diagram of prior art apparatus used for transferring data in parallel from a smaller to a larger register.

Referring to FIG. 1, there is provided in a prior known apparatus for transferring data in parallel from a smaller to a larger register designated generally as 1, a 16 stage data register 2, a plurality of 16 latches designated generally as 3 and a 32 stage data register designated generally as 4. In the register 4 there is provided a first set of 16 stages 5 and a second set of 16 stages 6. Typically, the stages 5 and 6 comprise D-flip-flops. The register 2 is coupled to a source of clock pulses 7 by means of a line 8. The latches 3 and the 32 stages in the register 4 are coupled to the source of clock pulses 7 through a divide-by-2 divider 9 by means of a line 10. The 16 stages of the register 2 are coupled to the inputs of the 16 latches 3 and to the inputs of the second set 6 of 16 stages in the register 4 by means of a 16 line data bus 15. The outputs of the 16 latches 3 are coupled to the inputs of the first set of 16 stages 5 of the register 4 by means of a 16 line bus 18. The outputs of the register 4 are provided on a 32 line bus designated generally as 14.

Figure 2:
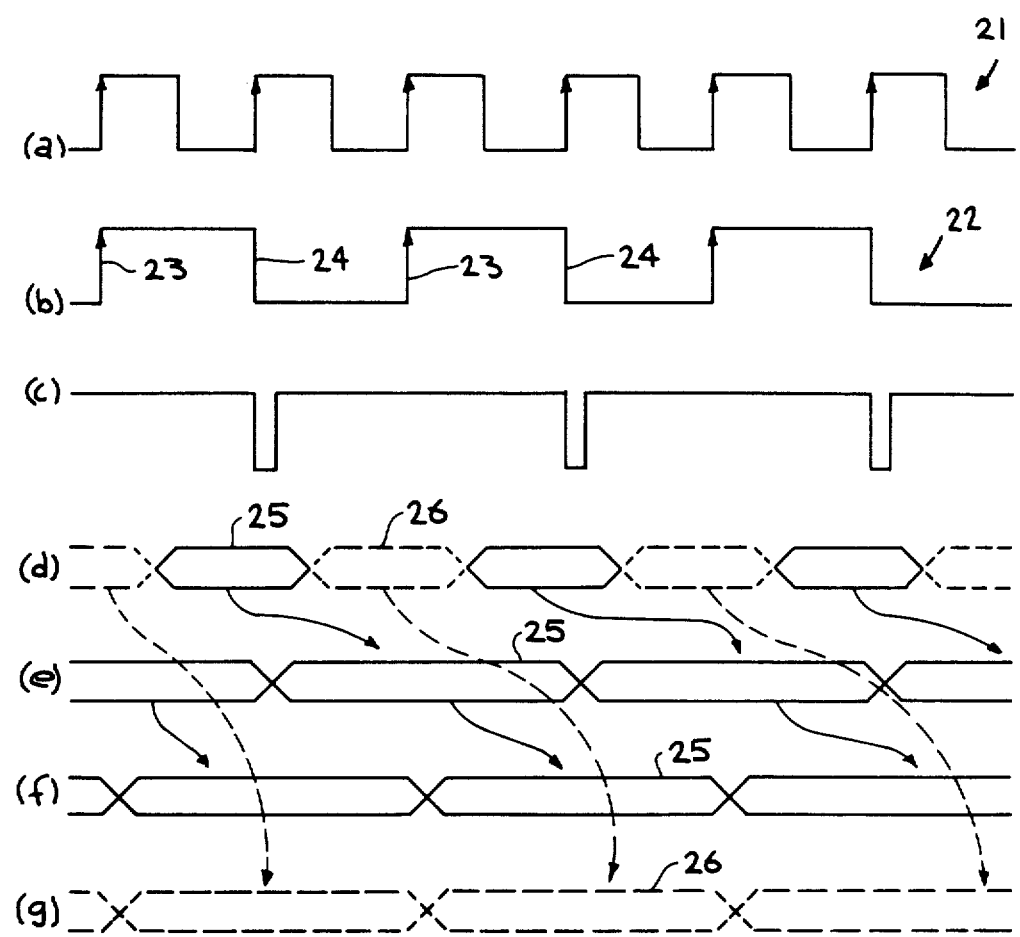
FIG. 2 (comprised of (a) through (g)) is a diagram of data and clock signals.

Referring to FIG. 2, there is provided a plurality of timing diagrams (a)–(g). Diagrams (a), (b) and (d)–(g) show the timing of clock and data signals in the apparatus of FIG. 1. These diagrams and diagram (c) show the timing of clock and data signals in the apparatus of FIG. 3. In diagram (a) there is shown a plurality of clock pulses 21 which are used for clocking data out of the register 2. In diagram (b) there is shown a plurality of clock pulses 22 which are used for clocking data into and out of the latches 3 and register 4. It will be noted that the rate of the pulses 21 is twice the rate of the pulses 22 and that each of the pulses 22 have a leading positive- going edge 23, as shown by an arrow, and a trailing negative-going edge 24. In diagram (c) there is shown the pulse used in the apparatus of FIG. 3, but not in apparatus of FIG. 1. In diagram (d) there is shown a representation of a plurality of pairs of 16 parallel bit words, each pair comprising a first word 25 (solid lines) and a second word 26 (dash lines). In diagram (e) there is shown a representation of the timing of the first word 25 after it has been latched in the latches 3 and made available on the input of the first set of stages 5 of the register 4. In diagrams (f) and (g) there are shown representations of the timing of the first word 25 and the second word 26 after they have been transferred through the register 4 and made available on the output of the register 4.

In the operation of the apparatus of FIG. 1, some time after the leading edge 23 of the pulses 22, the first word 25 is transferred to the input of the latches 3 by the clock pulses 21. One of the conditions of this transfer is that the signal levels forming the first word 25 must be stable, i.e., the data must be valid, at a time which coincides with the trailing edge 24 of the pulses 22, as shown by diagrams (b) and (d) of FIG. 2. On the trailing edge 24, the latches 3 close, latching the word 25 on their output, which is also the input of the first set of stages 5 of the register 4, as shown by diagram (e).

Following the transfer of the first word 25 to the latches 3 and after the latches 3 are closed, the second word 26 is transferred to the second set of stages 6 of the register 4 by the clock pulses 21. One of the conditions of this transfer is that the signal levels forming the second word 26 must be stable, i.e., the data must be valid, at a time which coincides with the leading edge 23 of the pulses 22 as shown by diagrams (b) and (d) of FIG. 3. On the leading edge 23, the first and second sets of stages 5 and 6 of the register 4 transfer the words 25 and 26 at their input to their output in parallel, as shown by diagrams (f) and (g) of FIG. 3. On the following trailing edge 24, the stages 5 and 6 close. Immediately thereafter, the latches 3 open for receiving the first of the next pair of words to be transferred to the register 4.

Figure 3:
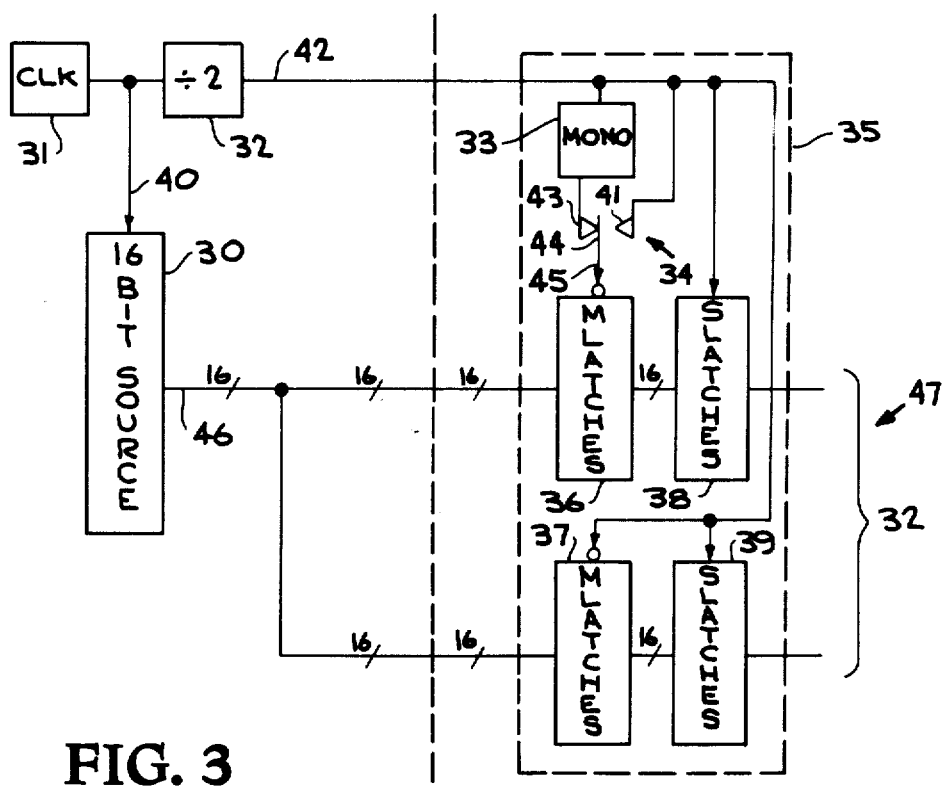
FIG. 3 is a block diagram of an embodiment of the present invention.

Referring to FIG. 3, there is provided in accordance with the present invention, a 16 stage register 30, a clock 31, a divide-by-2 divider 32, a monostable multivibrator, also called a one shot 33, a switch 34 having a pole 44 and a pair of contacts 41 and 43 and a 32 stage register designated generally as 35 comprising a first set of master latches 36 having inverting enabling inputs, a second set of master latches 37 having inverting enabling inputs, a first set of slave latches 38 having non-inverting enabling inputs and a second set of slave latches 39 having non-inverting enabling inputs.

The register 30 is coupled to the output of the clock 31 by means of a line 40. The output of the divide-by-2 divider 32 is coupled to the one shot 33, the contact 41 of the switch 34, the enabling inputs of the first set of slave latches 38, the inverting enabling inputs of the second set of master latches 37 and the enabling inputs of the second set of slave latches 39 by means of a line 42. The output of the one shot 33 is coupled to the contact 43 of the switch 34. The pole 44 is coupled to the enabling inputs of the first set of master latches 36 by means of a line 45. The data output lines of the register 30 are coupled to the first set of master latches 36 and the second set of master latches 37 by means of a 16 line bus 46. The output of the register 35 is provided on 32 lines designated generally as 47.

Except as described below, the timing diagrams of FIG. 2 also illustrate the operation of the apparatus of FIG. 3.

Referring to FIG. 2, in the operation of the apparatus of FIG. 3, some time after the leading edge 23 of the pulses 22, the first word 25 is transferred to the input of the first set of master latches 36 by the clock pulses 21. One of the conditions of this transfer is that the signal levels forming the first word 25 must be stable, i.e., the data must be valid, at a time which coincides with the trailing edge 24 of the pulses 22, as shown by diagrams (b) and (d) of FIG. 2. On the trailing edge 24, with the pole 44 of the switch 34 in contact with the contact 43, the one shot 33 outputs a narrow negative-going pulse, as shown in diagram (c). The narrow pulse from the one shot 33 temporarily opens the first set of master latches 36 allowing the first word 25 on its input to be latched thereon and made available on its output, which is also the input of the first set of slave latches 38, as shown by diagram (e). The time that the first set of master latches 36 is open is approximately equal to the width of the pulse from the one shot 33 which, in a typical embodiment of the present invention, is approximately 2 nsec.

Following the latching of the first word 25 in the first set of master latches 36, the second word 26 is transferred to the second set of master latches 37. One of the conditions of this transfer is that the signal levels forming the second word 26 must be stable, i.e., the data must be valid, at a time which coincides with the leading edge 23 of the pulses 22, as shown by diagrams (b) and (d) of FIG. 3. On the leading edge 23, the second set of master latches 37 closes, latching the second word 26 and making it available to the slave latches 39. Immediately thereafter, the first set of slave latches 38 and the second set of slave latches 39 open, allowing the first word 25 and the second word 26 to be transferred to the output lines 47 of the register 35, as shown in diagrams (f) and (g). At the subsequent trailing edge of the pulses 22, the first and second set of slave latches 38 and 39 close, latching the first and second words 25 and 26. Immediately thereafter, the first set of master latches 36 are once again momentarily opened to receive the first of the next pair of words from the register 30 and the process of data transfer described above is repeated.

While a preferred embodiment of the present invention is described above, it is contemplated that various modifications may be made to the illustrated embodiment without departing from the spirit and scope of the present invention. Accordingly, it is intended that the embodiment described be considered only as illustrative of the invention and that the scope of the invention be determined by reference to the claims hereinafter provided.

I claim:

1. A method of transferring data words from a smaller to a larger register, said larger register comprising a first and a second set of master latches, each having an input, a first and a second set of slave latches, each having an input, and a means for coupling said latches to a source of clock pulses, comprising:
    (a) transferring a first word from said smaller register to said inputs of said first set of master latches which is valid at said inputs of said first set of master latches for a predetermined period of time between the leading edges of adjacent first and second ones of said clock pulses and for a predetermined period of time before and after the trailing edge of said first clock pulse;
    (b) latching said first word in said first set of master latches in response to and at a predetermined time following said trailing edge of said first clock pulse; thereafter
    (c) transferring a second word from said smaller register to said inputs of said second set of master latches which is valid at said inputs of said second set of master latches for a predetermined period of time between the trailing edges of said first and said second clock pulses and for a predetermined period of time before and after the leading edge of said second clock pulse;
    (d) latching said second word in said second set of master latches in response to said leading edge of said second clock pulse; and thereafter
    (e) latching said first and said second words in said first and said second sets of slave latches in response to said trailing edge of said second clock pulse.

2. A method according to claim 1 comprising the step of repeating said steps (a)–(e) for transferring additional first and second words from said smaller to said larger register.

3. A method according to claim 1 wherein said steps of transferring said first and said second words from said smaller register to said inputs of said first and said second set of master latches comprises the step of using a clock having a pulse rate which is greater than the pulse rate of the clock pulses provided by the source of clock pulses coupled to said latches.

4. A method according to claim 3 wherein the pulse rate of the clock pulses used for transferring said first and said second word from said smaller register to said inputs of said first and said second set of master latches is twice the pulse rate of the clock pulses provided by the source of clock pulses coupled to said latches.

5. A method according to claim 1 wherein said larger register comprises a one shot having an output coupled to a clock input of each one of said first set of master latches, and said latching step in paragraph (b) comprises the step of:
    generating, in response to said trailing edge of said first clock pulse, a clocking pulse having a predetermined pulse width on the output of said one shot.

6. A method according to claim 5 wherein said clocking pulse has a trailing edge and said latching step in paragraph (b) occurs on said trailing edge of said clocking pulse.

7. A method according to claim 5 wherein said trailing edge of said clocking pulse occurs before said transferring of said second word to said inputs of said second set of master latches.

8. An apparatus for transferring data words from a smaller to a larger register, said larger register having a first and a second set of master latches, each having an input, a first and a second set of slave latches, each having an input, and a means for coupling said latches to a source of clock pulses, comprising:
    (a) means for transferring a first word from said smaller register to said inputs of said first set of master latches which is valid at said inputs of said first set of master latches for a predetermined period of time between the leading edges of adjacent first and second ones of said clock pulses and for a predetermined period of time before and after the trailing edge of said first clock pulse;
    (b) means for latching said first word in said first set of master latches in response to and at a predetermined time following said trailing edge of said first clock pulse;
    (c) means for transferring a second word from said smaller register to said inputs of said second set of master latches after said latching of said first word in said first set of master latches which is valid at said inputs of said second set of master latches for a predetermined period of time between the trailing edges of said first and said second clock pulses and for a predetermined period of time before and after the leading edge of said second clock pulse;
    (d) means for latching said second word in said second set of master latches in response to said leading edge of said second clock pulse; and
    (e) means for latching said first and said second words in said first and said second sets of slave latches in response to said trailing edge of said second clock pulse after said latching of said second word in said second set of master latches.

9. An apparatus according to claim 8 wherein said means for transferring said first and said second words from said smaller register to said inputs of said first and said second set of master latches comprises a clock having a pulse rate which is greater than the pulse rate of the clock pulses provided by the source of clock pulses coupled to said latches.

10. An apparatus according to claim 9 wherein the pulse rate of the clock pulses used for transferring said first and said second word from said smaller register to said inputs of said first and said second set of master latches is twice the pulse rate of the clock pulses provided by the source of clock pulses coupled to said latches.

11. An apparatus according to claim 8 wherein said larger register comprises a one shot having an output coupled to a clock input of each one of said first set of master latches, and said means for latching in paragraph (b) comprises:

means for generating, in response to said trailing edge of said first clock pulse, a clocking pulse having a predetermined pulse width on the output of said one shot.

12. An apparatus according to claim 11 wherein said clocking pulse has a trailing edge and said means for latching in paragraph (b) comprises means for providing said latching on said trailing edge of said clocking pulse.

13. An apparatus according to claim 11 wherein said trailing edge of said clocking pulse occurs before said transferring of said second word to said inputs of said second set of master latches.

14. A method of transferring 32 bits from a 16 bit register having 16 output lines to a 32 bit register having a first set of 16 input lines and a second set of 16 input lines, said 32 bit register having one of its input lines from each of said first and said second sets of input lines coupled to one of said 16 output lines of said 16 bit register, a first and a second set of 16 master latches, each of said master latches having an input coupled to one of said 32 bit register input lines, an input coupled to a source of clock pulses for opening and closing said master latch and an output, and 32 slave latches, each having an input coupled to the output of one of said master latches, an input coupled to a source of clock pulses for opening and closing said slave latch and an output, comprising the steps of:

(a) closing all of said slave latches on a trailing edge of a first one of said clock pulses; thereafter (b) opening, in response to said trailing edge, all of said master latches;

(c) providing a first word from said 16 bit register on the inputs of said master latches which is stable for a predetermined period between the leading edges of said first clock pulse and an adjacent second clock pulse and about said trailing edge of said first clock pulse; thereafter (d) closing said first set of master latches before the occurrence of the leading edge of said second clock pulse for latching said first word in said first set of master latches and making said first word available to said slave latches coupled thereto; thereafter (e) providing a second word from said 16 bit register on the inputs of each of said first and said second sets of said master latches which is stable for a predetermined period between the trailing edges of said first and said second clock pulses and about a leading edge of said second clock pulse;

(f) closing said master latches in said second set of master latches on said leading edge of said second clock pulse for latching said second word in said second set of master latches and making it available to said input of the slave latches coupled thereto; and thereafter (g) opening all of said slave latches on the leading edge of said second clock pulse for transferring said first and said second words from the inputs to the outputs of said slave latches coupled to said first and said second set of master latches, respectively.

15. An apparatus for transferring 32 bits from a 16 bit register having 16 output lines to a 32 bit register having a first set of 16 input lines and a second set of 16 input lines, said 32 bit register having one of its input lines from each of said first and said second sets of input lines coupled to one of said 16 output lines of said 16 bit register, a first and a second set of 16 master latches, each of said master latches having an input coupled to one of said 32 bit register input lines, an input coupled to a source of clock pulses for opening and closing said master latch and an output, and 32 slave latches, each having an input coupled to the output of one of said master latches, an input coupled to a source of clock pulses for opening and closing said slave latch and an output, comprising:

(a) means for closing all of said slave latches on a trailing edge of a first one of said clock pulses;

(b) means for opening, in response to said trailing edge and after said slave latches are closed, all of said master latches;

(c) means for providing a first word from said 16 bit register on the inputs of said master latches which is stable for a predetermined period between the leading edges of said first clock pulse and an adjacent second clock pulse and about said trailing edge of said first clock pulse;

(d) means for closing said first set of master latches before the occurrence of the leading edge of said second clock pulse for latching said first word in said first set of master latches and making said first word available to said slave latches coupled thereto;

(e) means for providing a second word from said 16 bit register on the inputs of each of said first and said second sets of said master latches after said closing of said first set of master latches which is stable for a predetermined period between the trailing edges of said first and said second clock pulses and about a leading edge of said second clock pulse;

(f) means for closing said master latches in said second set of master latches on said leading edge of said second clock pulse for latching said second word in said second set of master latches and making it available to said input of the slave latches coupled thereto; and (g) means for opening all of said slave latches after said closing of said second set of master latches on the leading edge of said second clock pulse for transferring said first and said second words from the inputs to the outputs of said slave latches coupled to said first and said second set of master latches, respectively.

* * * * *